(12) United States Patent
Mangone, Jr.

(10) Patent No.: US 9,068,674 B1
(45) Date of Patent: Jun. 30, 2015

(54) CABLE, CONDUIT, PIPE AND WIRE AFFIXING CLIP

(71) Applicant: Peter G. Mangone, Jr., Golden, CO (US)

(72) Inventor: Peter G. Mangone, Jr., Golden, CO (US)

(*) Notice: Subject to any disclaimer, the term of this patent is extended or adjusted under 35 U.S.C. 154(b) by 27 days.

(21) Appl. No.: 14/109,854

(22) Filed: Dec. 17, 2013

(51) Int. Cl.
*F16B 2/08* (2006.01)
*F16L 3/12* (2006.01)

(52) U.S. Cl.
CPC .................................. *F16L 3/1211* (2013.01)

(58) Field of Classification Search
CPC ............... F16B 2/08; F16B 2/00; F16B 2/02; F16B 2/10; F16B 15/00; F16L 3/08; F16L 3/22
USPC ........... 248/71, 49, 68.1, 69, 74.3, 74.2, 74.1; 24/458, 16 PB, 17 AP; 411/400, 401
See application file for complete search history.

(56) References Cited

U.S. PATENT DOCUMENTS

| | | | | |
|---|---|---|---|---|
| 3,049,771 | A * | 8/1962 | Litwin et al. | 24/16 |
| 3,471,109 | A * | 10/1969 | Meyer | 248/68.1 |
| 3,900,923 | A * | 8/1975 | Thomas | 24/16 PB |
| 4,008,512 | A * | 2/1977 | Prodel | 24/16 PB |
| 4,272,047 | A * | 6/1981 | Botka | 248/74.3 |
| 4,458,385 | A * | 7/1984 | Espinoza | 24/16 PB |
| 4,510,650 | A * | 4/1985 | Espinoza | 24/16 PB |
| 4,733,440 | A * | 3/1988 | Ogawa | 24/170 |
| 4,805,856 | A * | 2/1989 | Nicoli et al. | 248/74.3 |
| 4,813,105 | A * | 3/1989 | Espinoza | 24/16 PB |
| 5,042,114 | A * | 8/1991 | Parrish | 24/16 PB |
| 5,263,231 | A * | 11/1993 | Sorensen et al. | 24/16 PB |
| 5,687,455 | A * | 11/1997 | Alexander | 24/16 PB |
| 5,745,959 | A * | 5/1998 | Dodge | 24/68 SK |
| 5,774,953 | A * | 7/1998 | Mao | 24/579.09 |
| 5,938,155 | A * | 8/1999 | Garland | 248/187.1 |
| 6,347,817 | B1 * | 2/2002 | Chou | 292/259 R |
| 6,382,570 | B1 * | 5/2002 | Simpson et al. | 248/74.3 |
| 6,715,449 | B1 * | 4/2004 | Jordan | 119/863 |
| 6,898,825 | B1 * | 5/2005 | Charest | 24/16 PB |
| 7,661,633 | B2 * | 2/2010 | Igarashi et al. | 248/74.3 |
| 8,056,192 | B1 * | 11/2011 | Posner | 24/272 |
| 8,281,462 | B2 * | 10/2012 | Kuhne et al. | 24/272 |
| 8,474,110 | B1 * | 7/2013 | Sherriff | 24/458 |
| 8,486,106 | B2 * | 7/2013 | Warburton | 606/203 |
| 2002/0189056 | A1 * | 12/2002 | Gallina et al. | 24/68 R |
| 2013/0081232 | A1 * | 4/2013 | Magno et al. | 24/16 PB |
| 2014/0082923 | A1 * | 3/2014 | Owen | 29/525.03 |

OTHER PUBLICATIONS

Peter Mangone, Inc., Multiple Conduit Clip P8 Drawings, Oct. 30, 2013, 6 pages.
Peter Mangone, Inc., Multiple Conduit Clip P9 Assembly 1A-C Drawings, Oct. 30, 2013, 3 pages.
Peter Mangone, Inc., Multiple Conduit Clip P10 Drawings, Aug. 1, 2013 and Oct. 30, 2013, respectively, 2 pages.

* cited by examiner

*Primary Examiner* — Nkeisha Smith
(74) *Attorney, Agent, or Firm* — Drinker Biddle & Reath LLP (57) ABSTRACT

A conduit clip having a pedestal with a conduit seat portion, a flexible strap extending from the pedestal, a latching section, and a clip section for receiving a fastening device positioned between the conduit seat and the latching section as well as sawteeth along at least a portion of the bottom of the flexible strap, a slot in the latching section to receive the strap and a latch member mounted in the latching section slot for engaging the sawteeth to lock the strap in place.

16 Claims, 8 Drawing Sheets

CABLE, CONDUIT, PIPE AND WIRE AFFIXING CLIP

FIELD

This invention pertains to a cable, conduit, pipe, tubing or wire affixing clip and, more particularly, to an easy to manufacture and use clip for gathering and locking together multiple cables, conduits, pipes, tubes, or wires and affixing them in place.

BACKGROUND

Multiple cables, wires, flexible conduits, pipes, tubes, and conduits are often run in close proximity for television, internet, telephony, electrical power and other applications. Where the conduits, cables, pipes, tubes, and wires (referred to collectively below as "conduits") are not affixed in place, they can be unstable, subject to damage or tangling, difficult to identify, and unsightly. Various clips have been developed over the years to address these issues by locking conduits into bundles in the clips and affixing the clips to surfaces in proximity to the conduits.

These prior clips have a variety of drawbacks including difficulty in manipulating multiple conduits into the clips and reliably locking the clips about the multiple conduits. Prior clips are also typically designed to gather the conduits into the clips before the clips are attached to proximal surfaces. This may make it difficult to maneuver the conduit-containing clips into place and to attach them to the proximal surfaces. Also, if it is necessary to open these prior clips in order to remove, add or replace conduits, the entire clip must be loosened from its mounting or removed entirely from its initial mounting on the proximal surface. Finally, prior clips may not be capable of being reliably relocked. The present conduit clip embodiments solve these problems with a structure that is economical to manufacture, can be mounted to proximal surfaces prior to gathering and locking conduits into place in the clips, is easy to use in gathering and locking about multiple conduits and affixing the conduits to proximal surfaces, and which may be readily unlocked and relocked as desired.

SUMMARY

In an embodiment, a conduit clip is provided with a pedestal and flexible strap extending from the pedestal where multiple conduits may be captured with the strap and locked against a conduit seat portion of the pedestal, and the clip may be affixed to a surface either before (or less desirably after) gathering and locking the conduits into the clip.

In other embodiments, a conduit clip is provided with an easily installed and operated latch member that engages sawteeth on the bottom of the flexible strap of the clip and may be readily opened to release the strap by lifting up on a tab on the latch member.

BRIEF DESCRIPTION OF THE DRAWINGS

In order to aid in understanding the invention, it will now be described in connection with exemplary embodiments with reference to the accompanying drawings in which like numbers are given to like features with reference to the accompanying drawings wherein.

DETAILED DESCRIPTION OF THE INVENTION

Figure 1:
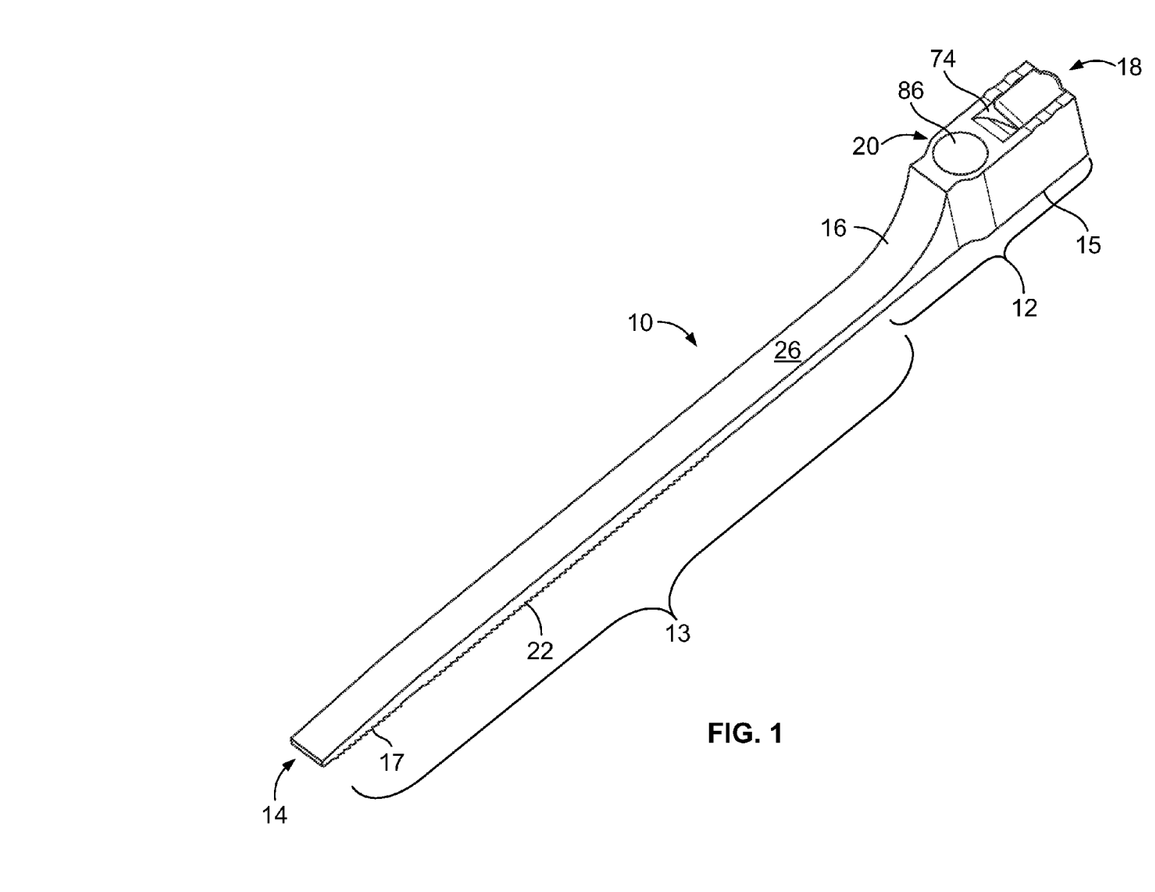
FIG. 1 is a perspective view of a conduit clip embodiment.
Figure 2:
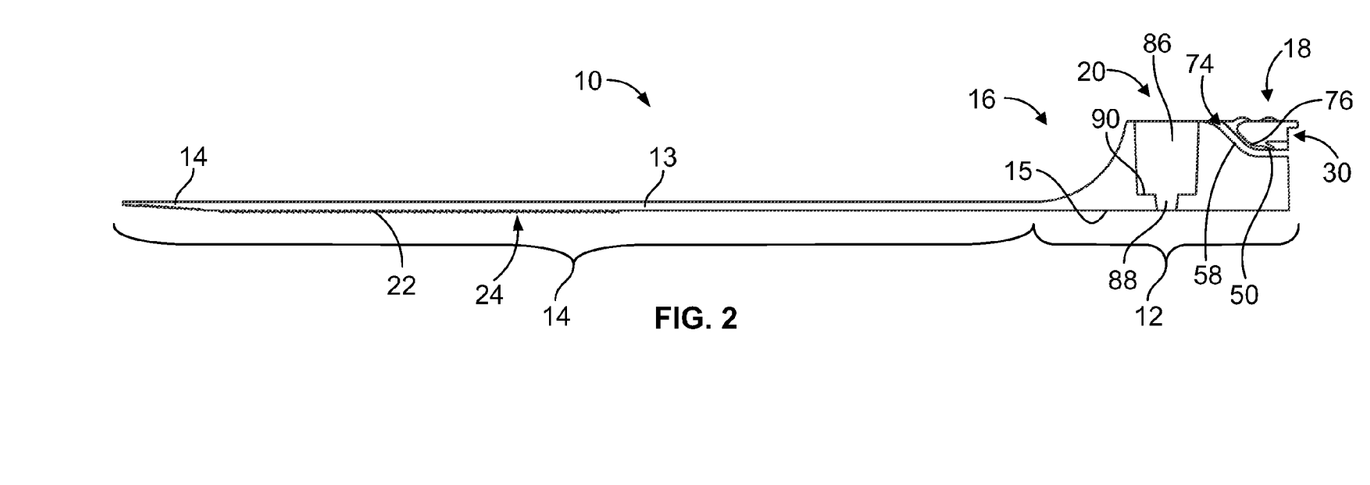
FIG. 2 is a side elevation view of the embodiment of FIG. 1 which has been longitudinally cut away to better illustrate features of the conduit clip pedestal.

Turning now to FIGS. 1 and 2, conduit clip embodiment 10 is illustrated having a pedestal 12 and a flexible strap 13 extending from the pedestal. Clip 10 may be made of nylon or any other appropriate moldable, strong and flexible material.

Pedestal 12 has a bottom surface 15, a curved conduit seat portion 16, a latching section 18 and an affixing section 20 positioned between the conduit seat and the latching section. Bottom surface 15 may have ridges or a roughened surface to help resist rotation of the clip once it is attached to a surface.

Strap 13 has a bottom surface 22 provided with a series of sawteeth 24, which preferably will be generally rearwardly directed as shown, extending laterally across the bottom strap surface. Sawteeth 24 may, however, also be oriented perpendicularly to bottom surface 15. The sawteeth may be provided along a distal portion of the strap bottom surface (as shown) or the sawteeth may cover the entirety of the strap bottom surface or be positioned at other locations on the bottom surface of the strap as required to retain a desired number of conduits within the clip when the strap is fully latched. The top surface of the strap may be beveled near its end as shown to facilitate insertion into the latching section of the clip and it may be provided with a sawtooth gripping surface 17 to facilitate handling of the strap end. The length of the strap can be varied as necessary to accommodate different sizes, types, and numbers of conduits.

Figure 3:
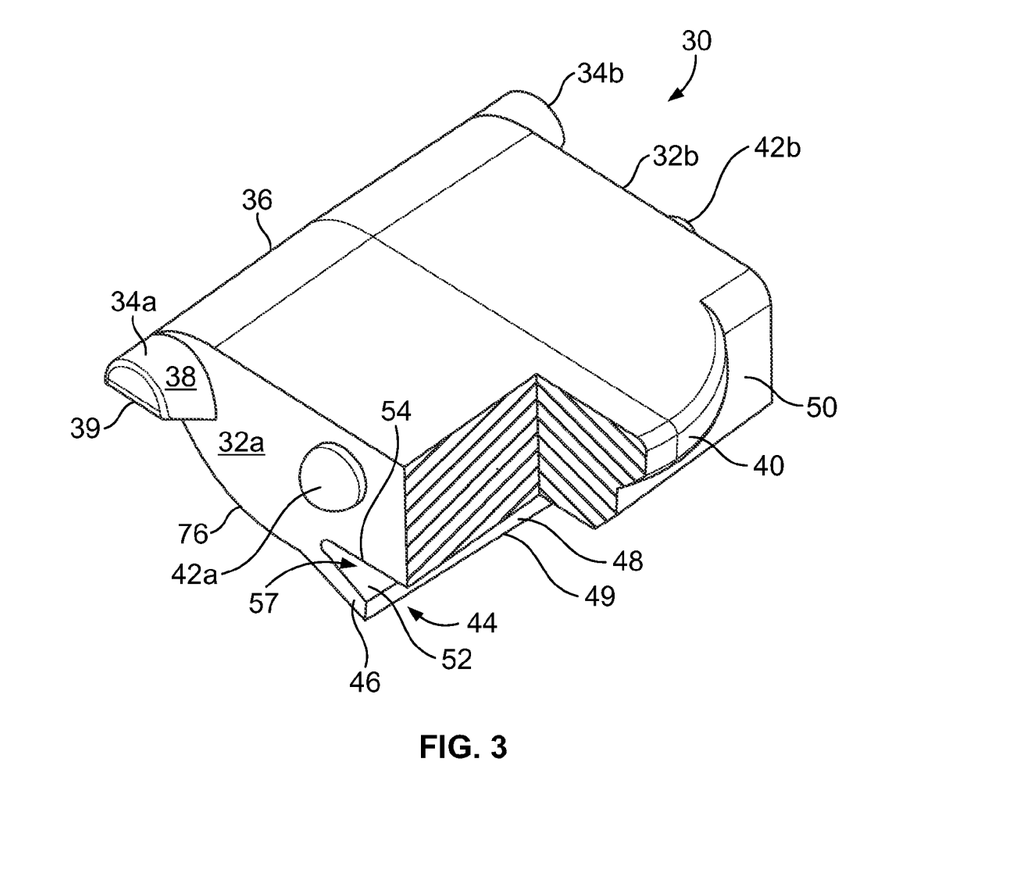
FIG. 3 is an enlarged view of the latch member of the conduit clip embodiment of FIG. 1, partially cut away at one corner to better reveal features of the latch member.

Latching section 18 includes a latch member 30 which is shown in FIGS. 2 and 3 and illustrated in enlarged cutaway form in FIG. 3. The latch member includes opposite sides 32*a* and 32*b* and a distal rear edge 36. Oppositely directed pivot supports 34*a* and 34*b* are located adjacent rear edge 36 of the latch member and protuberances 42*a* and 42*b* are spaced from pivot supports 34*a* and 34*b* on latch member sides 32*a* and 32*b*. In the illustrated embodiment, the protuberances are hemispherical and the pivot supports are of a half-moon configuration with a curved top surface 38 and preferably a slanted bottom surface forming a lead in bevel 39. The pivot supports may be of other desired configurations, so long as they include a round top surface so that they may pivot within the crowns 63*a*/63*b* of side wall slots 62*a*/62*b* described below in connection with FIG. 4A.

Latch member 30 further includes a tab 40 comprising a generally flat projection that extends beyond the proximal edge 50 of the latch member to aid a user in opening the latch member. The latch member also includes a catch member 44 comprising a resilient tang 46 that is directed generally downwardly and proximally from the bottom surface 54 of the latch member. Tang 46 has a generally flat proximal end 48 defining a knife edge 49 that is spaced inwardly from the proximal edge 50 of the latch member. Finally, the top surface 52 of the resilient tang is spaced from the bottom surface 54 of the latch member leaving a generally triangular cavity 57 therebetween which permits the tang to flex toward surface 54 as sawteeth 24 move past when the conduit clip strap is drawn through strap-receiving cavity 74 between the bottom surface 76 of the latch member and the floor 58 of latching section slot 56, as will be discussed in more detail below.

Although as explained earlier, clip 10 may be made of nylon or any other appropriate moldable, strong and flexible material, in an embodiment latch member 30 may be made of nylon with the rest of the clip made of a more flexible material like polypropylene.

Figure 4A:
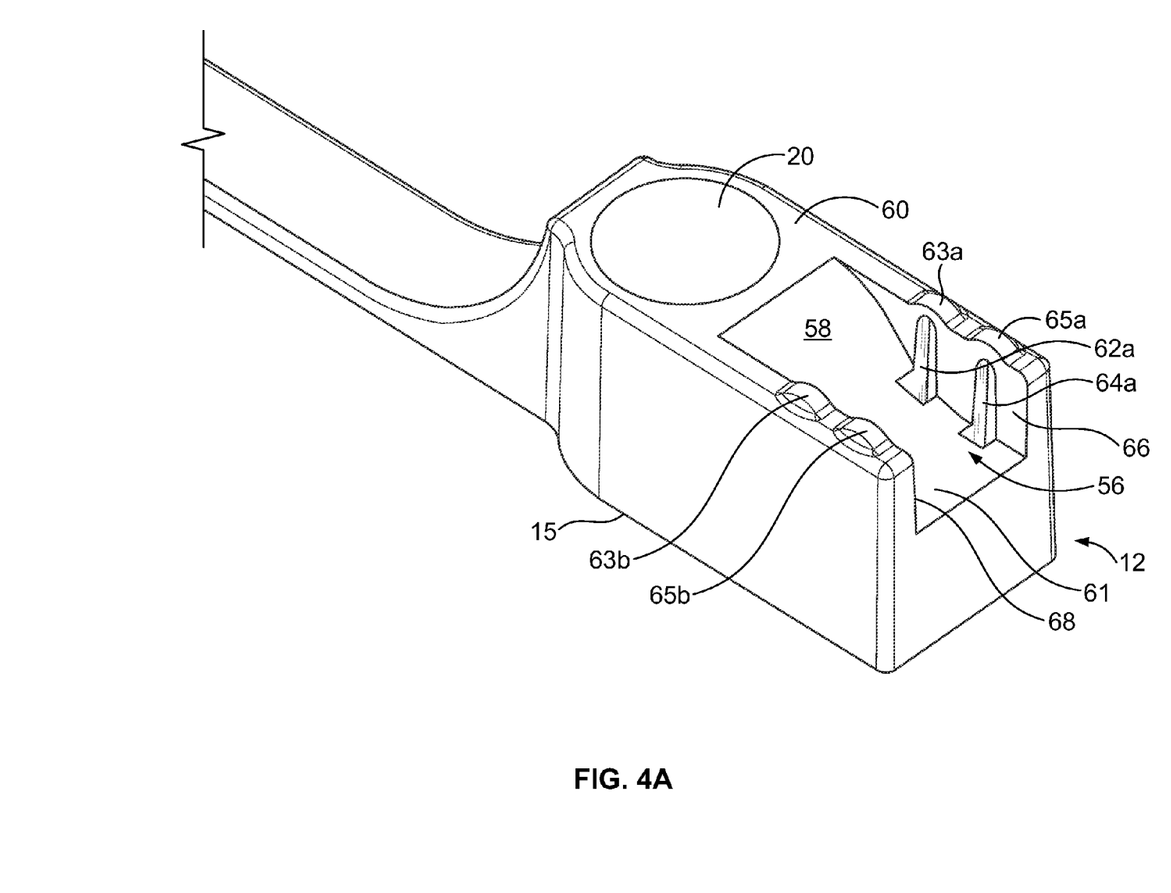
FIG. 4A is a partial enlarged perspective view of the pedestal of the conduit clip with the latch member removed to better illustrate the slot in the pedestal.

Turning now to FIG. 4A, pedestal 12 is shown in enlarged form. As can be seen in this figure, pedestal 12 has a latching section slot 56 formed in its proximal end that is located adjacent affixing section 20 and opens distally from the pedestal. latching section slot 56 has a floor 58 that angles downwardly from the top surface 60 of the pedestal and is formed as a distal sloping surface ending at a surface 61 at the proximal end of the slot which is generally parallel to pedestal bottom surface 15. Sloping floor 58 facilitates the insertion and locking of the strap in the latching section. However, the floor of the slot maybe shaped as desired, so long as it provides sufficient clearance from the bottom surface 76 of the latch member when it is in position in the slot to permit strap 13 to pass through strap-receiving cavity 74.

As can also be seen in FIG. 4A, side wall slots 62a and 64a are formed in latching section slot wall 66. Mirror image slots 62b and 64b are formed in latching section slot wall 68 but cannot be seen in this view. Slots 62a/62b and 64a/64b are curved at the top of the slots as shown and closed by semicircular crowns 63a/63b and 65a/65b. Crowns 63a/63b trap pivot supports 34a/34b in slots 62a/62b so that the latch member may pivot within the slots. Side wall slots 64a/64b in turn removably receive protuberances 42a/42b which abut semicircular crowns 65a/65b when the latch member is locked in place, as will be described below.

Figure 4B:
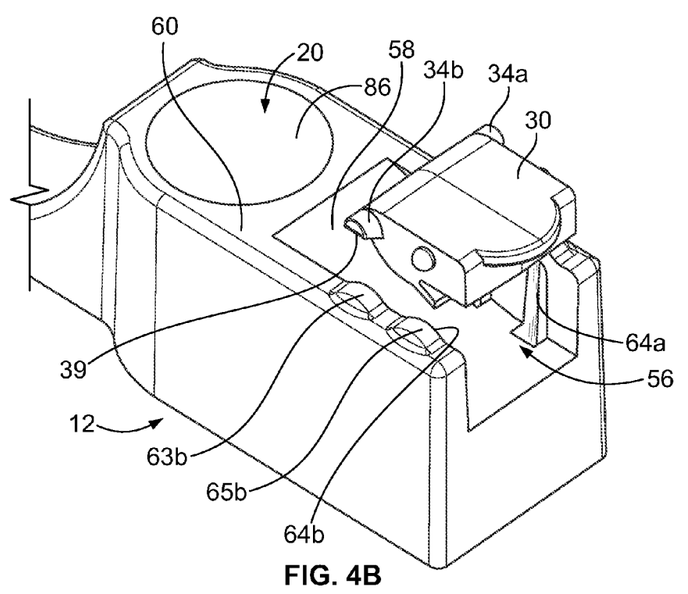
FIGS. 4B-4E are partial enlarged perspective views of the pedestal of the conduit clip embodiment of FIG. 1 illustrating the attachment of the latch member to the slot in the pedestal.
Figure 4C:
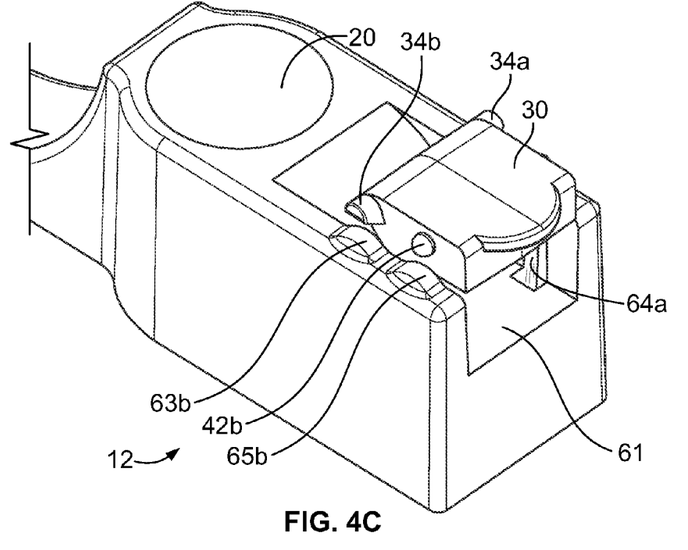
Figure 4D:
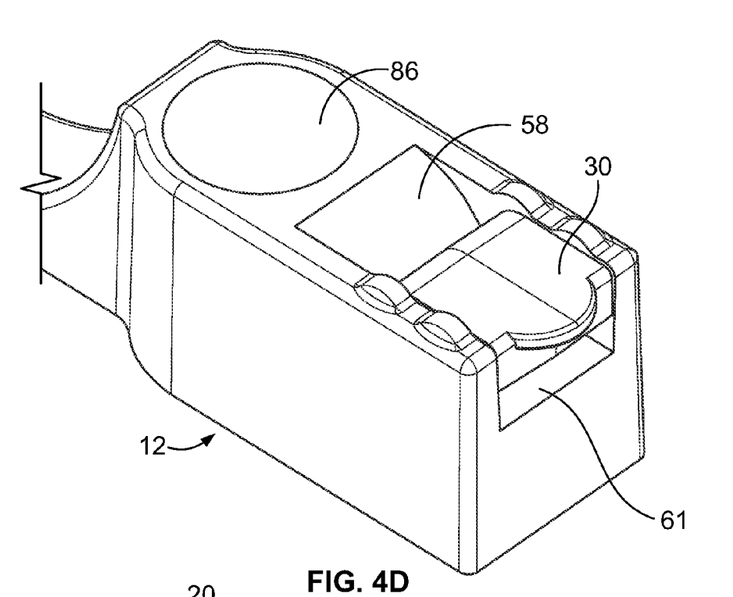
Figure 4E:
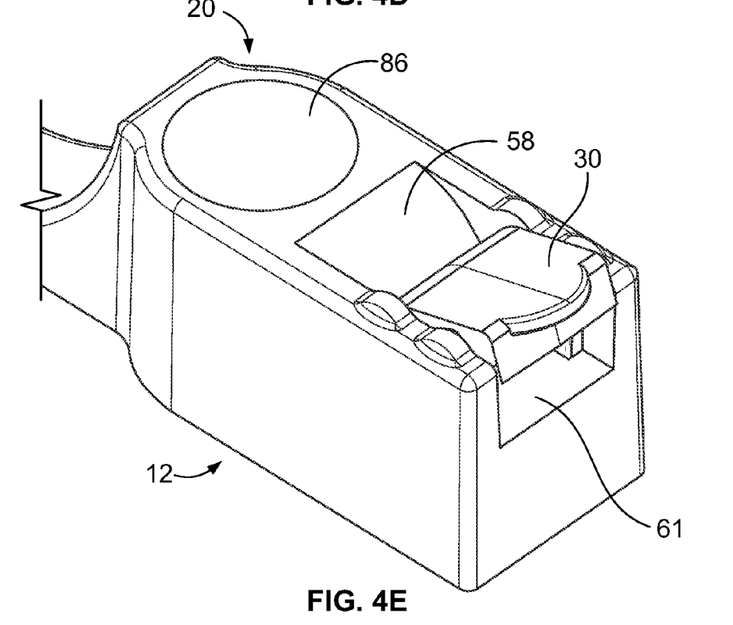

The assembly of latch member 30 within latching section slot 56 is illustrated in FIGS. 4B-4D. Thus, in FIG. 4B, latch member 30 is shown positioned above latching section slot 56, with pivot supports 34a/34b and their lead in bevels 39 aligned with side wall slots 62a/62b and protuberances 42a/42b aligned with side wall slots 64a/64b. The locking member is then pressed downwardly through the position shown in FIG. 4C, causing latching section slot walls 66 and 68 to flex outwardly as the pivot supports and protuberances pass crowns 63a/63b and 65a/65b which flex outwardly with the latching section slot walls to permit the pivot supports and protuberances to clear the crowns. This process is facilitated by lead in bevels 39 which help lever the slot walls outwardly during the assembly process.

When the pivot supports and protuberances come to rest in the slots, the latching section slot walls move back into their rest position. Preferably the pedestal will be warmed sufficiently to facilitate the flexure of the latching section slot walls. And, in a particularly preferred embodiment, the latch members will be pressed into place immediately after the body of the clip is molded and still warm. In this fully assembled configuration, the latch member is free to pivot up and down within a range determined by the range of movement of protuberances 42a/42b within side wall slots 64a and 64b. And, once the latch member is in place, strap-receiving cavity 74 (FIG. 2) is also established between the bottom surface 76 of latch member 30 and latching section slot floor 58.

Figure 5A:
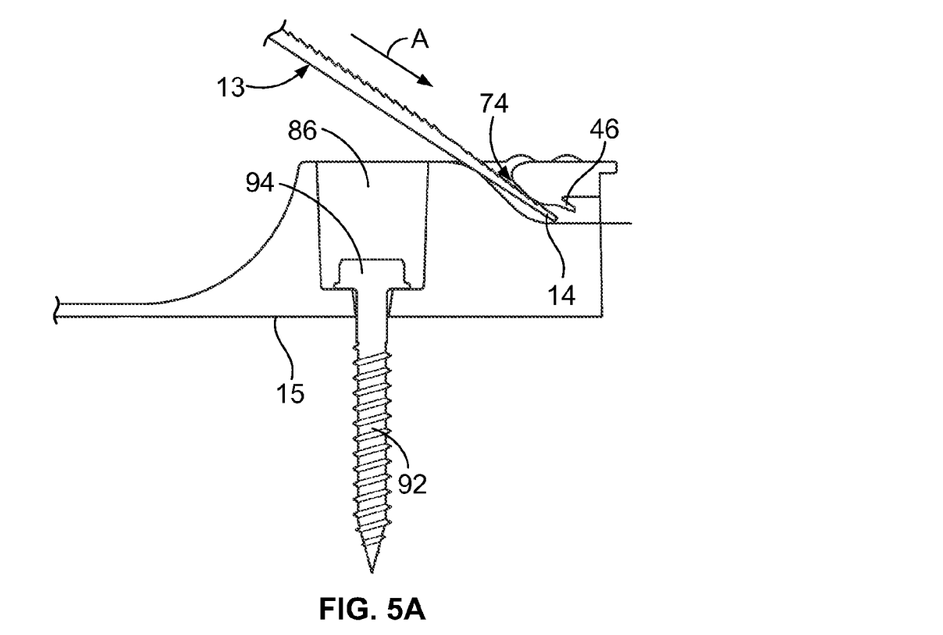
FIGS. 5A-5C are partial, cutaway elevation views of the pedestal of the conduit clip embodiment of FIG. 1 showing insertion of the strap portion of the clip into the latching mechanism, and unlocking/removal of the strap from the latching mechanism.
Figure 5B:
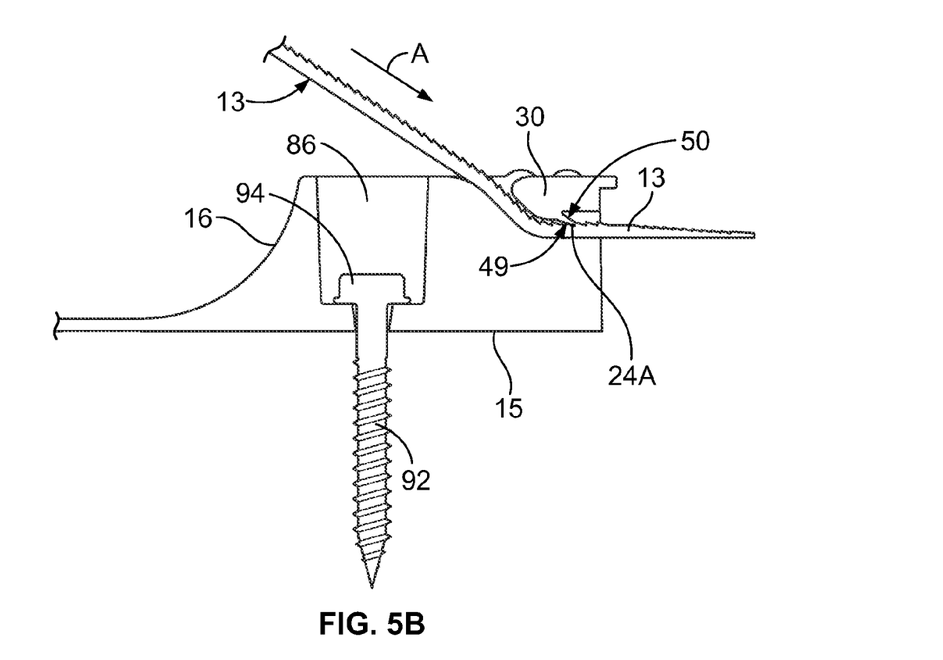
Figure 5C:
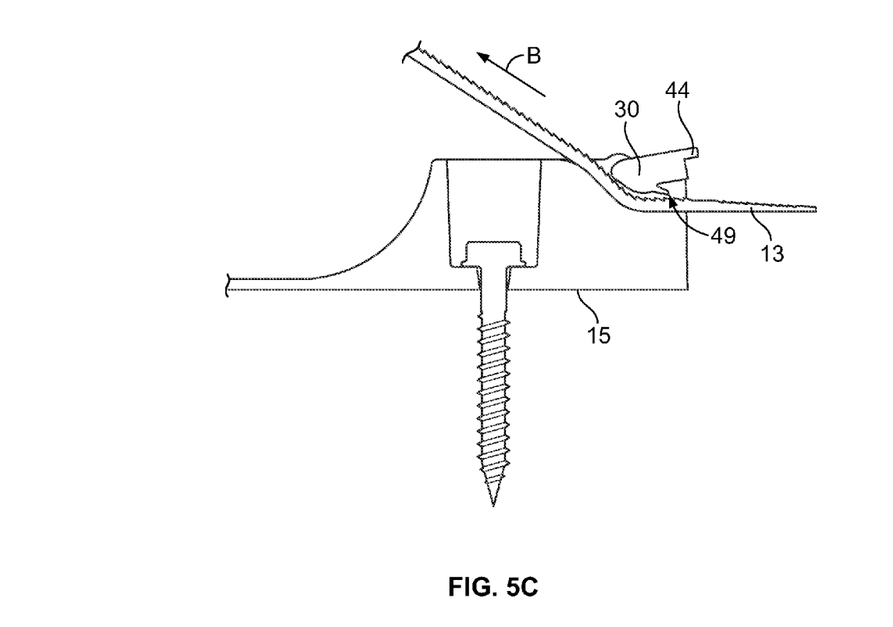

Turning now to FIG. 5A, the distal end 14 of flexible strap 13 is shown being moved in direction "A" into strap receiving cavity 74. In FIG. 5B the strap is shown well advanced through the strap receiving cavity so that knife edge 49 of tang 46 engages one of the sawteeth, e.g., sawtooth 24a, and withdrawal of the strap is prevented. In FIG. 5C, a user has pulled upwardly on latch catch 44 to disengage knife edge 49 of tang 46 from sawtooth 42a and further to position the latch member away from the sawteeth of the strap. In this way, the strap is unlocked and may be withdrawn from the strap-receiving cavity in direction "B".

Figure 6:
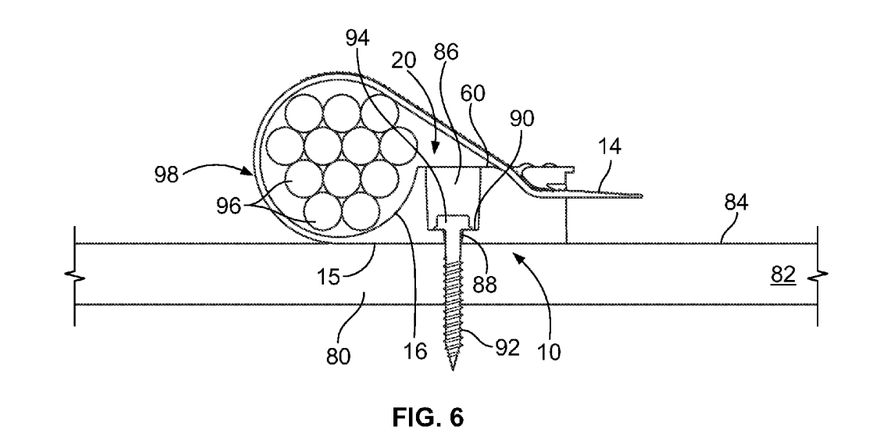
FIG. 6 shows a side elevation view of a locked and mounted conduit clip configuration with the conduit clip embodiment of FIG. 1 attached to a surface and a group of conduits (shown cut away) locked into place in the clip thereby affixing multiple conduits to the proximal surface.

Next, FIG. 6 shows a conduit clip 10 affixed in place with its bottom surface 15 resting against a desired location on surface 84 of a supporting member 82. As can be seen in this figure, affixing section 20 has a first bore 86 that passes through top surface 60 of the pedestal and a second smaller bore 88 centered with respect to bore 86 to form a ledge 90 surrounding the entrance to bore 88. Although affixing section 20 is shown with bores 86 and 88 for accepting a single surface penetrating fastening device, the affixing section may include bores for accepting two or more spaced apart fasteners to minimize rotation of the clip after it is installed.

In FIG. 6, a surface penetrating fastening device such as a screw 92 having an enlarged head 94 has been passed through bore 88 and screwed home through surface 84 so that the enlarged head rests against pedestal 90, thereby fastening the conduit clip against supporting member 82. Multiple conduits 96 are shown gathered in a conduit corral 98 defined by strap 13. These conduits are thus held in place within the conduit corral by drawing the strap across the conduits and locking the strap in place within the conduit corral formed in latching section 18.

The conduit clip may be used as follows:

1. Conduit clip 10 is located at a desired location on a supporting member 82 as illustrated in FIG. 6 by positioning the clip where desired with respect to the supporting member (e.g., for a vertical or horizontal conduit run), with the clip bottom surface against the supporting member surface and fastening the clip to the supporting member by passing a surface penetrating fastening device through the affixing section and into the supporting member. The conduit clip will be open, in the configuration illustrated, for example, in FIG. 2.

2. A conduit or multiple conduits 96 are then placed on the strap which is in the configuration illustrated, for example, in FIG. 2, either one by one or together at one time so that at least some of the outer conduits rest against conduit seat 16.

3. Strap 13 is then lifted up to gather and draw the conduits together and distal end 14 of the strap is passed into strap-receiving cavity 74 as illustrated, for example, in FIG. 5A. The strap is then drawn through the strap-receiving cavity until the strap tightly encircles the conduit or conduits, firmly corralling the conduits. The counterforce produced by the strap encircling the conduits which is directed towards removal of the strap (direction B of FIG. 5C) will ensure and maintain secure engagement between strap sawteeth 24 and knife edge 49 of resilient tang 46. This produces the arrangement illustrated in FIG. 6 with conduits 96 firmly in place adjacent supporting member 82 and strap end 14 projecting away from the clip generally parallel to surface 84 of the supporting member.

4. If, however, it is desired to remove or add a conduit (or conduits) to the conduit or conduits within corral 98, the user will engage latch member catch 44 to rotate latch member 30 upwardly as shown in FIG. 5C, thereby disengaging knife edge 49 of tang 46 from the strap sawteeth so that the strap may be withdrawn either partially or in its entirety from the strap receiving cavity and a conduit either added or removed, as desired. When the latch member is disengaged in this way, protuberances 42a/42b will clear side wall slot crowns 65a/65b. The strap will then be reinserted as appropriate and again drawn around the remaining conduits by pulling it through strap-receiving cavity 74 until blade knife edge 49 engages the appropriate sawtooth.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the embodiments of the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

Table of Reference Characters

| | |
|---|---|
| 10 | conduit clip |
| 12 | pedestal |
| 13 | flexible strap |
| 14 | end of flexible strap |
| 15 | pedestal bottom surface |
| 16 | conduit seat portion |
| 17 | sawtooth gripping surface |
| 18 | latching section |
| 20 | affixing section |
| 22 | bottom surface of strap |
| 24 | strap sawteeth |
| 24a | selected sawtooth |
| 30 | latch member |
| 32a/32b | sides of latch member |
| 34a/34b | pivot supports |
| 36 | distal rear edge of latch member |
| 38 | curved top surface of pivot supports |
| 39 | lead in bevel |
| 40 | latch member tab |
| 42a/42b | protuberances |
| 44 | catch member |
| 46 | resilient tang |
| 48 | proximal end of tang |
| 49 | knife edge of resilient tang |
| 50 | proximal edge of latch member |
| 52 | top surface of tang |
| 54 | bottom surface of latch member |
| 56 | slot in latching section of pedestal |
| 57 | triangular cavity |
| 58 | latching section slot floor |

Table of Reference Characters
-continued

| | |
|---|---|
| 60 | top surface of pedestal |
| 61 | flat floor surface at proximal end of slot |
| 62a/62b | slots in side walls of latching section slot |
| 63a/63b | crowns of slots 62a/62b |
| 64a/64b | slots in side walls of latching section slot |
| 65a/65b | crowns of slots 64a/64b |
| 66/68 | side walls of slot |
| 74 | strap-receiving cavity |
| 76 | bottom surface of latch member |
| 82 | supporting member |
| 84 | surface of supporting member |
| 86 | first bore pedestal |
| 88 | second smaller bore in pedestal |
| 90 | edge surrounding smaller bore |
| 92 | surface penetrating fastening device |
| 94 | head of surface penetrating fastening device |
| 96 | plurality of conduits, (cable, wires, flexible conduits or rigid conduits) |
| 98 | conduit corral |

I claim:

1. A conduit clip comprising:
a pedestal having a conduit seat portion, a flexible strap extending from the pedestal at the seat portion and having a bottom surface, a latching section, and a clip affixing section for receiving a fastening device positioned between the conduit seat and the latching section;
sawteeth along at least a portion of the bottom of the strap;
a slot in the latching section opening distally from the pedestal to receive the strap; and
a latch member mounted in the latching section slot for engaging the sawteeth to lock the strap in place, the latch member including opposite sides, a distal rear edge, and pivot supports located on the opposite sides adjacent to the rear edge, where the pivot supports are pivotally mounted in the latching section slot, in which the latching section slot is located between spaced latching section slot walls and the latch member includes protuberances spaced from the pivot supports on the opposite sides and the protuberances removably engage side slots in the spaced latching section slot walls.

2. The conduit clip of claim 1 in which the sawteeth extend laterally across the bottom surface of the strap.

3. The conduit clip of claim 1 in which the sawteeth are directed rearwardly toward the pedestal.

4. The conduit clip of claim 1 in which the sawteeth cover the entirety of the bottom surface of the strap.

5. The conduit clip of claim 1 in which the latching section slot is located between spaced latching section slot walls and the pivot supports are mounted in side slots in the latching section slot walls.

6. The conduit clip of claim 1 in which the pivot supports include a slanted bottom surface forming a lead in bevel to assist in assembling the latch member to the latching section slot.

7. The conduit clip of claim 1 in which the latch member includes a proximal edge and a tab comprising a flat projection extending beyond the proximal edge of the latch member for lifting the latch member to remove the protuberances from the side slots and thereby disengage the latch member from the sawteeth.

8. The conduit clip of claim 1 in which the latching section slot has a floor that angles downwardly from top surface of the pedestal.

9. The conduit clip of claim 1 in which the pedestal has a bottom surface with ridges or a roughened surface to resist clip rotation when the clip is attached.

10. The conduit clip of claim 1 in which the clip affixing section is adapted to receive at least two fastening devices.

11. The conduit clip of claim 1 in which clip is made of nylon.

12. The conduit clip of claim 1 in which the latch member is made of nylon and a remaining portion of the conduit clip is made of polypropylene.

13. A method of making a conduit clip comprising:
providing a pedestal having a conduit seat portion, a flexible strap extending from the pedestal at the seat portion, a latching section, and an affixing section positioned between the conduit seat and the latching section, as well as sawteeth along at least a portion of the bottom of the flexible strap, a slot in the latching section located between spaced slot walls opening distally from the pedestal to receive the strap and a latch member with pivot supports and protuberances on opposite sides mounted in the latching section slot for engaging the sawteeth to lock the strap in place, where the latching section slot walls include pivot support and protuberance receiving slots closed at their top with crowns;
positioning the latch member above the latching section slot with its pivot supports and protuberances aligned with the pivot support and protuberance receiving slots; and
pressing downwardly on a locking member to cause the latching section slot walls to flex outwardly as the pivot supports and protuberances pass the side wall slot crowns which flex outwardly with the latching section slot walls as the pivot supports and protuberances are received in the pivot support and protuberance receiving slots.

14. The method of claim 13 in which lead in bevels are present on the pivot supports and the lead-in bevels lever the slot walls outwardly as the pivot supports and protuberances pass the side wall slot crowns.

15. The method of claim 13 including warming the pedestal to facilitate flexure of the latching section slot walls.

16. A conduit clip comprising:
a pedestal having a conduit seat portion, a flexible strap extending from the pedestal at the seat portion, a latching section, and a clip affixing section for receiving a fastening device positioned between the conduit seat and the latching section;
sawteeth along at least a portion of a bottom of the flexible strap;
a slot in the latching section opening distally from the pedestal to receive the strap; and
a latch member mounted in the latching section slot for engaging the sawteeth to lock the strap in place, in which the latch member includes a catch member with a resilient tang for engaging the sawteeth directed generally downwardly and proximally from the bottom surface of the latch member and the tang includes a generally flat proximal end defining a knife edge spaced inwardly from proximal edge of the latch member.

* * * * *